US012614039B2

(12) United States Patent (10) Patent No.: US 12,614,039 B2
Miura et al. (45) Date of Patent: Apr. 28, 2026

(54) INFORMATION PROCESSING APPARATUS, INFORMATION PROCESSING METHOD, AND INFORMATION PROCESSING PROGRAM

(71) Applicant: FUJIFILM CORPORATION, Tokyo (JP)

(72) Inventors: Yasuhide Miura, Tokyo (JP); Takumi Takahashi, Tokyo (JP); Tomoki Taniguchi, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 275 days.

(21) Appl. No.: 18/496,936

(22) Filed: Oct. 30, 2023

(65) Prior Publication Data

US 2024/0184995 A1 Jun. 6, 2024

(30) Foreign Application Priority Data

Dec. 2, 2022 (JP) ................................. 2022-193632

(51) Int. Cl.
*G06F 17/00* (2019.01)
*G06F 40/295* (2020.01)
*G06F 40/40* (2020.01)

(52) U.S. Cl.
CPC ............ *G06F 40/40* (2020.01); *G06F 40/295* (2020.01)

(58) Field of Classification Search
None
See application file for complete search history.

(56) References Cited

U.S. PATENT DOCUMENTS

| | | | | |
|---|---|---|---|---|
| 2021/0104234 A1* | 4/2021 | Zhang | ..................... | G06F 40/30 |
| 2022/0164683 A1* | 5/2022 | Hao | ........................ | G06N 3/044 |
| 2022/0180197 A1* | 6/2022 | Miura | .................... | G06N 3/045 |
| 2022/0180198 A1* | 6/2022 | Miura | .................... | G06F 40/30 |
| 2023/0098783 A1* | 3/2023 | Zaremoodi | ............ | G06N 3/044 |
| | | | | 704/243 |

OTHER PUBLICATIONS

Jie Ma et al., "Label Semantics for Few Shot Named Entity Recognition", ACL 2022 Findings, Mar. 16, 2022.
Rami Aly et al., "Leveraging Type Descriptions for Zero-shot Named Entity Recognition and Classification", Proceedings of the 59th Annual Meeting of the Association for Computational Linguistics and the 11th International Joint Conference on Natural Language Processing, pp. 1516-1528, Aug. 1-6, 2021.

* cited by examiner

*Primary Examiner* — Satwant K Singh
(74) *Attorney, Agent, or Firm* — SOLARIS Intellectual Property Group, PLLC

(57) ABSTRACT

An information processing apparatus extracts a phrase corresponding to a named entity included in an input sentence used for training a natural language processing model from data in which a phrase and a classification name of a named entity are associated with each other, adds the extracted phrase to the classification name corresponding to the extracted phrase among a plurality of different classification names which are set in advance, derives a similarity between a distributed representation of each word included in the input sentence and a distributed representation of each of the plurality of classification names to which the phrase is added, and select a classification name of each word included in the input sentence from among the plurality of classification names based on the derived similarity.

13 Claims, 6 Drawing Sheets

The Federal Republic of Yugoslavia is the only country of the former Yugoslavia where Poles currently require visas .

$L_1$: location; example: Cambodia
$L_2$: person; example: Norodom
$L_3$: other; example: none

FIG. 7

The Federal Republic of Yugoslavia is the only country of the former Yugoslavia where Poles currently require visas .

$L_1$: location; example: Yugoslavia
$L_2$: person; example: Poles
$L_3$: other; example: country

FIG. 8

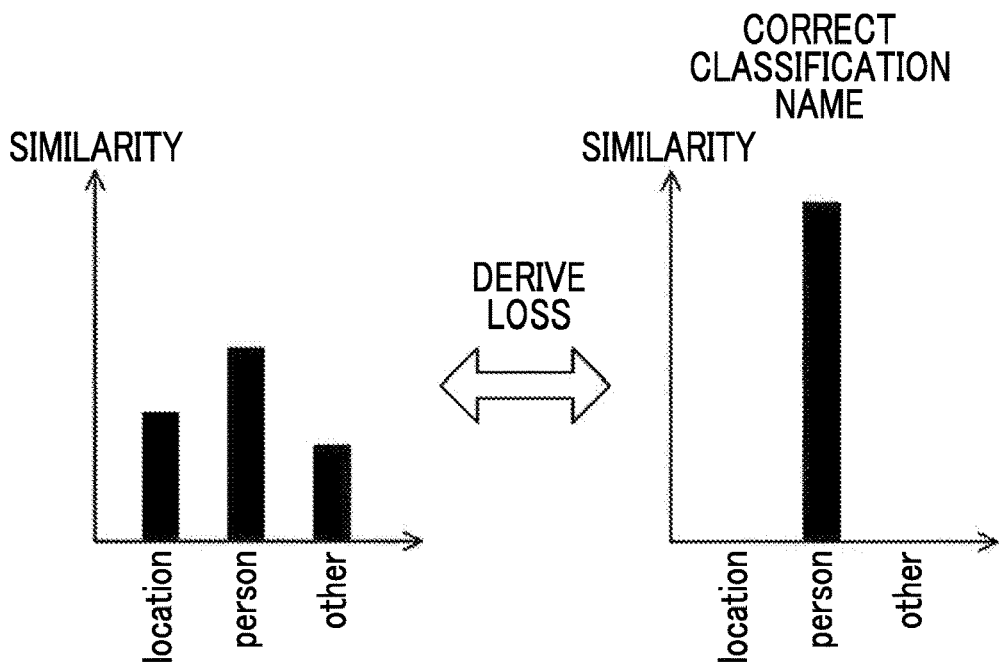

FIG. 10

START

~S30
EXTRACT PHRASE CORRESPONDING
TO UNIQUE REPRESENTATION INCLUDED
IN INPUT SENTENCE

~S32
DERIVE DISTRIBUTED REPRESENTATION
OF EACH WORD INCLUDED IN INPUT
SENTENCE

~S34
ADD PHRASE TO CLASSIFICATION NAME

~S36
DERIVE DISTRIBUTED REPRESENTATION
OF EACH OF PLURALITY OF
CLASSIFICATION NAMES

~S38
DERIVE SIMILARITY

~S40
SELECT CLASSIFICATION NAME

END

INFORMATION PROCESSING APPARATUS, INFORMATION PROCESSING METHOD, AND INFORMATION PROCESSING PROGRAM

CROSS-REFERENCE TO RELATED APPLICATIONS

This application claims priority from Japanese Patent Application No. 2022-193632, filed on Dec. 2, 2022, the entire disclosure of which is incorporated herein by reference.

BACKGROUND

1. Technical Field

The present disclosure relates to an information processing apparatus, an information processing method, and an information processing program.

2. Description of the Related Art

In Label Semantics for Few Shot Named Entity Recognition, ACL 2022 Findings, a technique using a label name for machine learning of a trained model used for named entity recognition has been disclosed.

In Leveraging Type Descriptions for Zero-shot Named Entity Recognition and Classification, ACL 2021, a technique using a label description for machine learning of a trained model used for named entity recognition has been disclosed.

SUMMARY

In the technique using the label name, due to a small amount of information in the label name, there is room for improvement in accuracy of machine learning. As a result, there is also room for improvement in accuracy of named entity recognition.

In the technique using the label description, the label description is required. In order to improve accuracy of machine learning, it takes time and effort for a user to prepare a high-quality label description, and as a result, there is room for improvement in terms of efficiency.

The present disclosure has been made in view of the above circumstances, and an object of the present disclosure is to provide an information processing apparatus, an information processing method, and an information processing program capable of efficiently improving accuracy of named entity recognition.

According to a first aspect of the present invention, there is provided an information processing apparatus including: at least one processor, in which the processor is configured to: extract a phrase corresponding to a named entity included in an input sentence used for training a natural language processing model from data in which a phrase and a classification name of a named entity are associated with each other; add the extracted phrase to the classification name corresponding to the extracted phrase among a plurality of different classification names which are set in advance; derive a similarity between a distributed representation of each word included in the input sentence and a distributed representation of each of the plurality of classification names to which the phrase is added; and select a classification name of each word included in the input sentence from among the plurality of classification names based on the derived similarity.

According to a second aspect of the present invention, in the information processing apparatus according to the first aspect, the data is training data used for training the natural language processing model.

According to a third aspect of the present invention, in the information processing apparatus according to the first aspect, the data is named entity dictionary data.

According to a fourth aspect of the present invention, in the information processing apparatus according to the second aspect or the third aspect, the processor is configured to: randomly extract the phrase from the data.

According to a fifth aspect of the present invention, in the information processing apparatus according to the second aspect or the third aspect, the processor is configured to: extract the phrase from the data in a preset order.

According to a sixth aspect of the present invention, in the information processing apparatus according to any one aspect of the first aspect to the fifth aspect, the processor is configured to: connect text data representing the extracted phrase with text data representing a classification name corresponding to the extracted phrase.

According to a seventh aspect of the present invention, in the information processing apparatus according to any one aspect of the first aspect to the sixth aspect, the processor is configured to: add a fixed phrase to the classification name corresponding to the extracted phrase in a case where the classification name of the named entity included in the input sentence represents a classification name other than the classification name of the named entity that is designated in advance.

According to an eighth aspect of the present invention, in the information processing apparatus according to any one aspect of the first aspect to the seventh aspect, the processor is configured to: derive, as the similarity, a vector similarity between the distributed representation of each word included in the input sentence and the distributed representation of each of the plurality of classification names.

According to a ninth aspect of the present invention, in the information processing apparatus according to any one aspect of the first aspect to the eighth aspect, the processor is configured to: select a classification name having a highest similarity that is derived from among the plurality of classification names.

According to a tenth aspect of the present invention, in the information processing apparatus according to any one aspect of the first aspect to the ninth aspect, the processor is configured to: derive a similarity distribution between each word included in the input sentence and the distributed representation of each of the plurality of classification names to which the phrase is added, and derive a loss between the derived similarity distribution and a correct classification name corresponding to the word, and train a first trained model that outputs the distributed representation of each word included in the input sentence and a second trained model that outputs the distributed representation of each of the plurality of classification names to which the phrase is added based on the derived loss.

According to an eleventh aspect of the present invention, in the information processing apparatus according to the tenth aspect, the processor is configured to: select a classification name of each word included in the input sentence in which classification names are unknown by using the first trained model and the second trained model.

According to a twelfth aspect of the present invention, there is provided an information processing method executed by a processor of an information processing apparatus, the method including: extracting a phrase corresponding to a named entity included in an input sentence used for training a natural language processing model from data in which a phrase and a classification name of a named entity are associated with each other; adding the extracted phrase to the classification name corresponding to the extracted phrase among a plurality of different classification names which are set in advance; deriving a similarity between a distributed representation of each word included in the input sentence and a distributed representation of each of the plurality of classification names to which the phrase is added; and selecting a classification name of each word included in the input sentence from among the plurality of classification names based on the derived similarity.

According to a thirteenth aspect of the present invention, there is provided an information processing program causing a processor of an information processing apparatus to execute a process including: extracting a phrase corresponding to a named entity included in an input sentence used for training a natural language processing model from data in which a phrase and a classification name of a named entity are associated with each other; adding the extracted phrase to the classification name corresponding to the extracted phrase among a plurality of different classification names which are set in advance; deriving a similarity between a distributed representation of each word included in the input sentence and a distributed representation of each of the plurality of classification names to which the phrase is added; and selecting a classification name of each word included in the input sentence from among the plurality of classification names based on the derived similarity.

According to the present disclosure, accuracy of named entity recognition can be efficiently improved.

BRIEF DESCRIPTION OF THE DRAWINGS

FIG. 5 is a block diagram illustrating an example of a functional configuration of the information processing apparatus in a learning phase.

FIG. 6 is a diagram illustrating text data connection processing according to an embodiment.

FIG. 7 is a diagram illustrating text data connection processing according to a modification example.

FIG. 8 is a diagram illustrating loss derivation processing.

FIG. 10 is a block diagram illustrating an example of a functional configuration of the information processing apparatus in an operation phase.

DETAILED DESCRIPTION

Hereinafter, an example of an embodiment for implementing the technology of the present disclosure will be described in detail with reference to the drawings.

Figure 1:
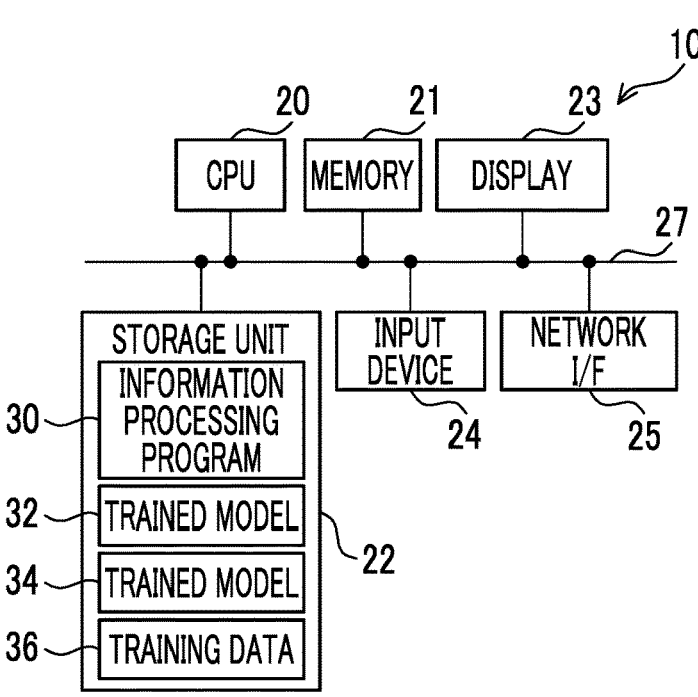
FIG. 1 is a block diagram illustrating an example of a hardware configuration of an information processing apparatus.

First, a hardware configuration of an information processing apparatus 10 according to the present embodiment will be described with reference to FIG. 1. Examples of the information processing apparatus 10 include a computer such as a personal computer or a server computer. As illustrated in FIG. 1, the information processing apparatus 10 includes a central processing unit (CPU) 20, a memory 21 as a transitory storage region, and a non-volatile storage unit 22. In addition, the information processing apparatus 10 includes a display 23 such as a liquid crystal display, an input device 24 such as a keyboard and a mouse, and a network interface (I/F) 25 connected to a network. The CPU 20, the memory 21, the storage unit 22, the display 23, the input device 24, and the network I/F 25 are connected to a bus 27. The CPU 20 is an example of a "processor" according to the disclosed technology.

The storage unit 22 is realized by a hard disk drive (HDD), a solid state drive (SSD), a flash memory, or the like. An information processing program 30 is stored in the storage unit 22 as a storage medium. The CPU 20 reads out the information processing program 30 from the storage unit 22, develops the read information processing program 30 in the memory 21, and executes the developed information processing program 30.

Further, the storage unit 22 stores a trained model 32, a trained model 34, and training data 36. The trained model 32 is an example of a first trained model according to the disclosed technology, and the trained model 34 is an example of a second trained model according to the disclosed technology. The training data 36 is data used to train the trained model 32 and the trained model 34 that are an example of a natural language processing model. The training data 36 is an example of data in which a phrase and a classification name of a named entity are associated with each other.

Figure 2:
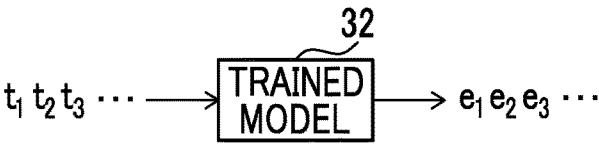
FIG. 2 is a diagram illustrating a first trained model.

As illustrated in FIG. 2, the trained model 32 is a natural language processing model that outputs a distributed representation of each word included in an input sentence in a case where the input sentence is input. In the present embodiment, the distributed representation is a vector in a case where a word is represented by a vector. The trained model 32 is obtained by pre-training in a technology such as bidirectional encoder representations from transformers (BERT) or a robustly optimized BERT approach (RoBERTa). $t_i$ ($i=1, 2, 3, \ldots$) in the example of FIG. 2 represents a word included in an input sentence, and $e_i$ represents a distributed representation of $t_i$. $t_i$ may be referred to as a token.

Figure 3:
FIG. 3 is a diagram illustrating a second trained model.

As illustrated in FIG. 3, in a case where text data representing a classification name of a named entity (hereinafter, simply referred to as "classification name") to which a phrase is added is input, the trained model 34 is a natural language processing model that outputs a distributed representation of the classification name to which the phrase is added. The trained model 34 is also obtained by pre-training in a technology such as BERT or RoBERTa. $L_i$ ($i=1, 2, 3$) in the example of FIG. 3 represents a classification name to which a phrase is added, and $l_i$ represents a distributed representation of $L_i$. That is, the trained model 34 outputs a distributed representation of each of a plurality of classification names to which a phrase is added. Details of $L_i$ will be described later.

Figure 4:
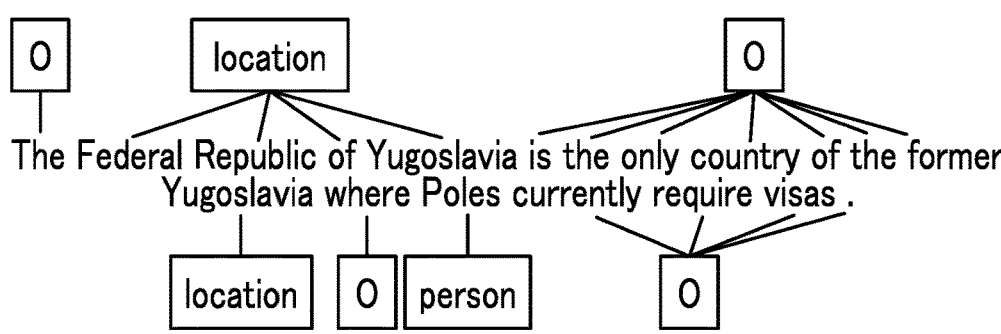
FIG. 4 is a diagram illustrating training data.

As illustrated in FIG. 4, the training data 36 is data in which a training input sentence and a classification name of each word of the input sentence are associated with each other. The training data 36 includes a plurality of sets of an input sentence and a classification name of each word of the input sentence. The named entity is a general term related to a proper noun such as a person name and a location name, a date representation, a time representation, or the like. The classification name of the named entity is a name of a type of a named entity such as a person name and a location name. In the example of FIG. 4, each word included in the input sentence is associated with any one of "person name" (referred to as "person" in FIG. 4), "location name" (referred to as "location" in FIG. 4), and "other" (referred to as "O (Other)" in FIG. 4) representing a named entity other than the person name and the location name.

Figure 5:
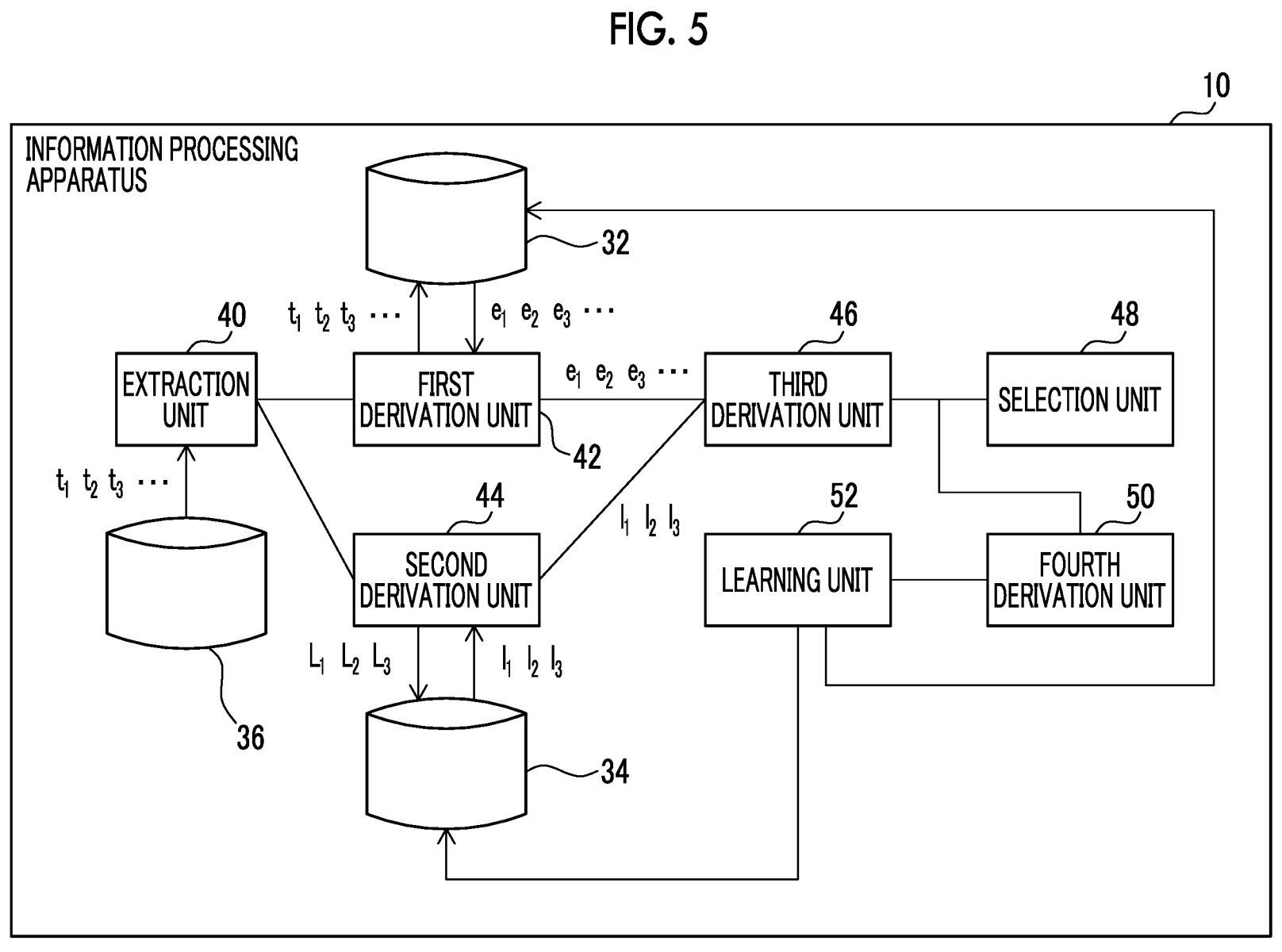

Next, a functional configuration of the information processing apparatus 10 in a learning phase will be described with reference to FIG. 5. As illustrated in FIG. 5, the information processing apparatus 10 includes an extraction unit 40, a first derivation unit 42, a second derivation unit 44, a third derivation unit 46, a selection unit 48, a fourth derivation unit 50, and a learning unit 52. By causing the CPU 20 to execute the information processing program 30, the information processing apparatus 10 function as the extraction unit 40, the first derivation unit 42, the second derivation unit 44, the third derivation unit 46, the selection unit 48, the fourth derivation unit 50, and the learning unit 52.

The extraction unit 40 extracts one input sentence from the training data 36, and extracts a phrase corresponding to the named entity included in the extracted input sentence from the training data 36. Specifically, the extraction unit 40 randomly extracts one phrase that is associated with the classification name associated with each word included in the input sentence from the training data 36. The phrase used herein means a word or a compound word. The number of the phrases extracted in this case is not limited to one, and may be two or more.

For example, in a case where the input sentence includes a word "Yugoslavia" and a location name is associated with "Yugoslavia" as the classification name, the extraction unit 40 randomly extracts, from the training data 36, one phrase associated with the location name.

The extraction unit 40 may extract, from the training data 36, the phrase that is associated with the classification name associated with each word included in the input sentence in a preset order. Specifically, for example, the extraction unit 40 extracts, from the training data 36, one or two or more phrases that are associated with the classification name associated with each word included in the input sentence in descending order of appearance frequency.

The first derivation unit 42 inputs one input sentence extracted by the extraction unit 40 to the trained model 32. The trained model 32 outputs a distributed representation of each word included in the input sentence. Thereby, the first derivation unit 42 derives a distributed representation of each word included in one input sentence extracted by the extraction unit 40.

The second derivation unit 44 adds the extracted phrase to the classification name corresponding to the phrase extracted by the extraction unit 40 among a plurality of different classification names that are set in advance. In the present embodiment, an example in which three classification names of a person name, a location name, and the other are applied as a plurality of classification names will be described. The person name and the location name are classification names of the named entities designated in advance, and the other represents a classification name other than the classification name of the named entity designated in advance. The classification name of the named entity in this case is designated in advance by, for example, a user, a developer who implements named entity recognition, or the like. The number of the classification names is not limited to three, and may be two or may be four or more.

Specifically, the second derivation unit 44 connects text data representing the extracted phrase with text data representing the classification name corresponding to the phrase extracted by the extraction unit 40. FIG. 6 illustrates an example of a result of processing of adding the phrase to the classification name. The sentence in FIG. 6 represents an input sentence, and $L_1$ to $L_3$ represent text data in which the classification name and the phrase are connected. In addition, FIG. 6 illustrates an example in which the classification name and the phrase are connected via a word "example" such that the added phrase can be determined from the text data as an actual example of the classification name. In addition, FIG. 6 illustrates an example in which three classification names of a person name, a location name, and the other are present as the classification names of the named entities included in the input sentence. In addition, FIG. 6 illustrates an example in which "Cambodia" is extracted as the phrase corresponding to the location name and "Norodom" is extracted as the phrase corresponding to the person name.

As illustrated in FIG. 6, in a case where the classification name of the named entity included in the input sentence is "other" representing a classification name other than the classification name of the named entity designated in advance, the second derivation unit 44 adds a fixed phrase to the classification name. FIG. 6 illustrates an example in which "none" is added as a fixed phrase. The text data in FIG. 6 in which the classification name and the phrase are connected is $L_i$ illustrated in FIG. 3.

As illustrated in FIG. 7, in a case where the classification name is "other", the second derivation unit 44 may randomly extract a phrase having the classification name "other" from the training data, instead of a fixed phrase, and add the extracted phrase. FIG. 7 illustrates an example in which "country" is added to "other".

Next, the second derivation unit 44 inputs the plurality of classification names to which the phrase is added, to the trained model 34. The trained model 34 outputs a distributed representation of each of the plurality of classification names to which the input phrase is added. Thereby, the second derivation unit 44 derives a distributed representation of each of the plurality of classification names to which the phrase is added.

The third derivation unit 46 derives a similarity between the distributed representation of each word that is derived by the first derivation unit 42 and the distributed representation of each of the plurality of classification names to which the phrase is added that is derived by the second derivation unit 44. In the present embodiment, the third derivation unit 46 derives a vector similarity between the distributed representation of each word that is represented by a vector and the distributed representation of each of the plurality of classification names to which the phrase is added. Examples of the similarity include a vector inner product, a cosine similarity, and the like.

The selection unit 48 selects the classification name of each word included in the input sentence from the plurality of classification names based on the similarity derived by the third derivation unit 46. In the present embodiment, the selection unit 48 selects a classification name having a highest similarity derived by the third derivation unit 46 from among the plurality of classification names.

As illustrated in FIG. 8, the fourth derivation unit 50 derives a similarity distribution between each word included in the input sentence and the distributed representation of each of the plurality of classification names to which the phrase is added that is derived by the third derivation unit 46, and derives a loss between the derived similarity distribution and a correct classification name corresponding to the word. The example in FIG. 8 illustrates the similarity distribution in a case where the similarity between the distributed representation of the word and the distributed representation of each of the plurality of classification names to which the phrase is added is higher in order of the person name, the location name, and the other. Further, the example in FIG. 8 illustrates a case where the similarity of the correct classification name is an upper limit value of the similarity and the similarity other than in the correct classification name is zero, that is, a case where the correct classification name is the person name.

Specifically, the fourth derivation unit 50 derives the above-described loss according to Equation (1). Equation (1) is an equation in a case where cross entropy is used for calculation of the loss, and $e^{x}{}_{y}$ in Equation (1) represents the similarity of the correct classification name.

$$l(x, y) = \log \frac{e^{x_y}}{\sum_c e^{x_c}} \tag{1}$$

The learning unit 52 trains the trained model 32 and the trained model 34 based on the loss derived by the fourth derivation unit 50. Specifically, the learning unit 52 trains the trained model 32 and the trained model 34 such that the loss derived by the fourth derivation unit 50 is minimized.

Figure 9:
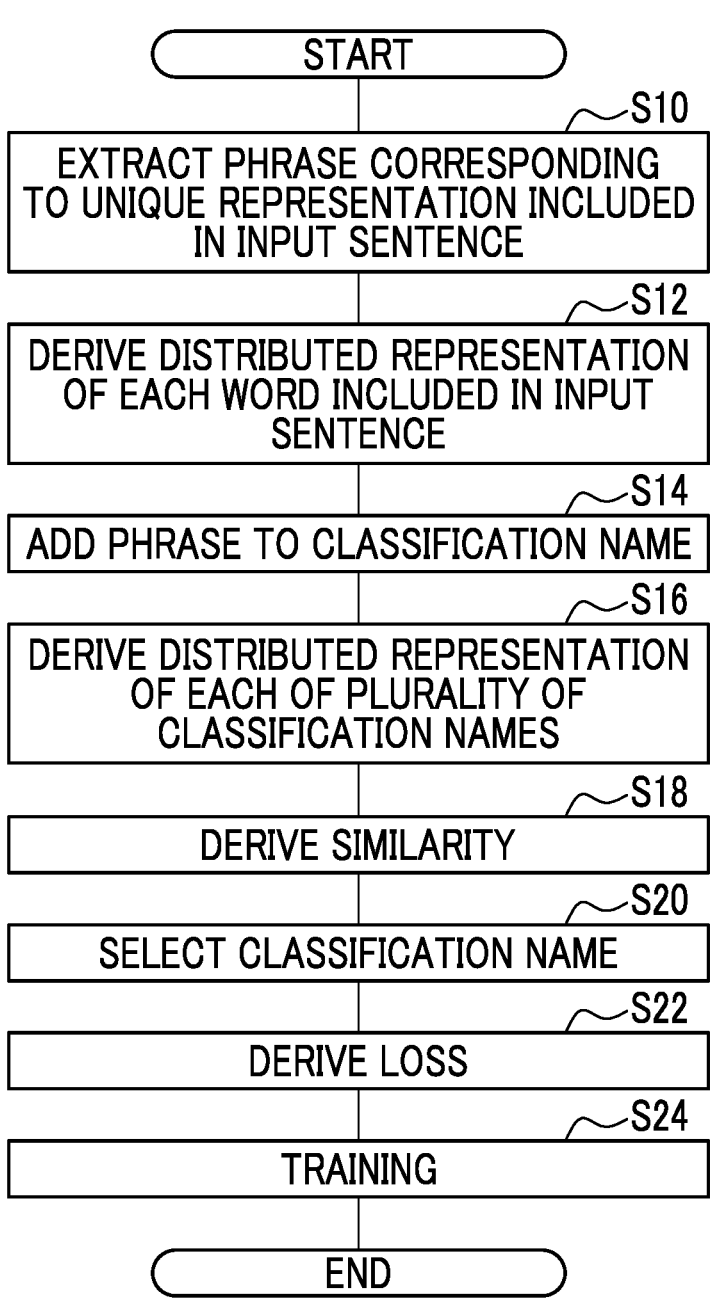
FIG. 9 is a flowchart illustrating an example of learning processing.

Next, an operation of the information processing apparatus 10 in a learning phase will be described with reference to FIG. 9. By causing the CPU 20 to execute the information processing program 30, learning processing illustrated in FIG. 9 is executed. The learning processing illustrated in FIG. 9 is executed, for example, in a case where the user inputs an execution start instruction.

In step S10 of FIG. 9, as described above, the extraction unit 40 extracts one input sentence from the training data 36, and extracts a phrase corresponding to the named entity included in the extracted input sentence from the training data 36. In step S12, as described above, the first derivation unit 42 derives a distributed representation of each word included in the input sentence by inputting one input sentence extracted in step S10 to the trained model 32.

In step S14, as described above, the second derivation unit 44 adds the extracted phrase to the classification name corresponding to the phrase extracted in step S10 among the plurality of different classification names that are set in advance. In step S16, as described above, the second derivation unit 44 derives a distributed representation of each of the plurality of classification names to which the phrase is added by inputting the plurality of classification names to which the phrase is added in step S14 to the trained model 34.

In step S18, as described above, the third derivation unit 46 derives a similarity between the distributed representation of each word that is derived in step S12 and the distributed representation of each of the plurality of classification names to which the phrase is added that is derived in step S16. In step S20, as described above, the selection unit 48 selects the classification name of each word included in the input sentence from the plurality of classification names based on the similarity derived in step S18.

In step S22, as described above, the fourth derivation unit 50 derives a similarity distribution between each word included in the input sentence and the distributed representation of each of the plurality of classification names that is derived in step S18, and derives a loss between the derived similarity distribution and a correct classification name corresponding to the word. In step S24, as described above, the learning unit 52 trains the trained model 32 and the trained model 34 based on the loss derived in step S22. In a case where processing of step S24 is ended, the learning processing is ended. By executing the learning processing on each input sentence included in the training data 36, accuracy of the trained model 32 and the trained model 34 is improved.

Figure 10:
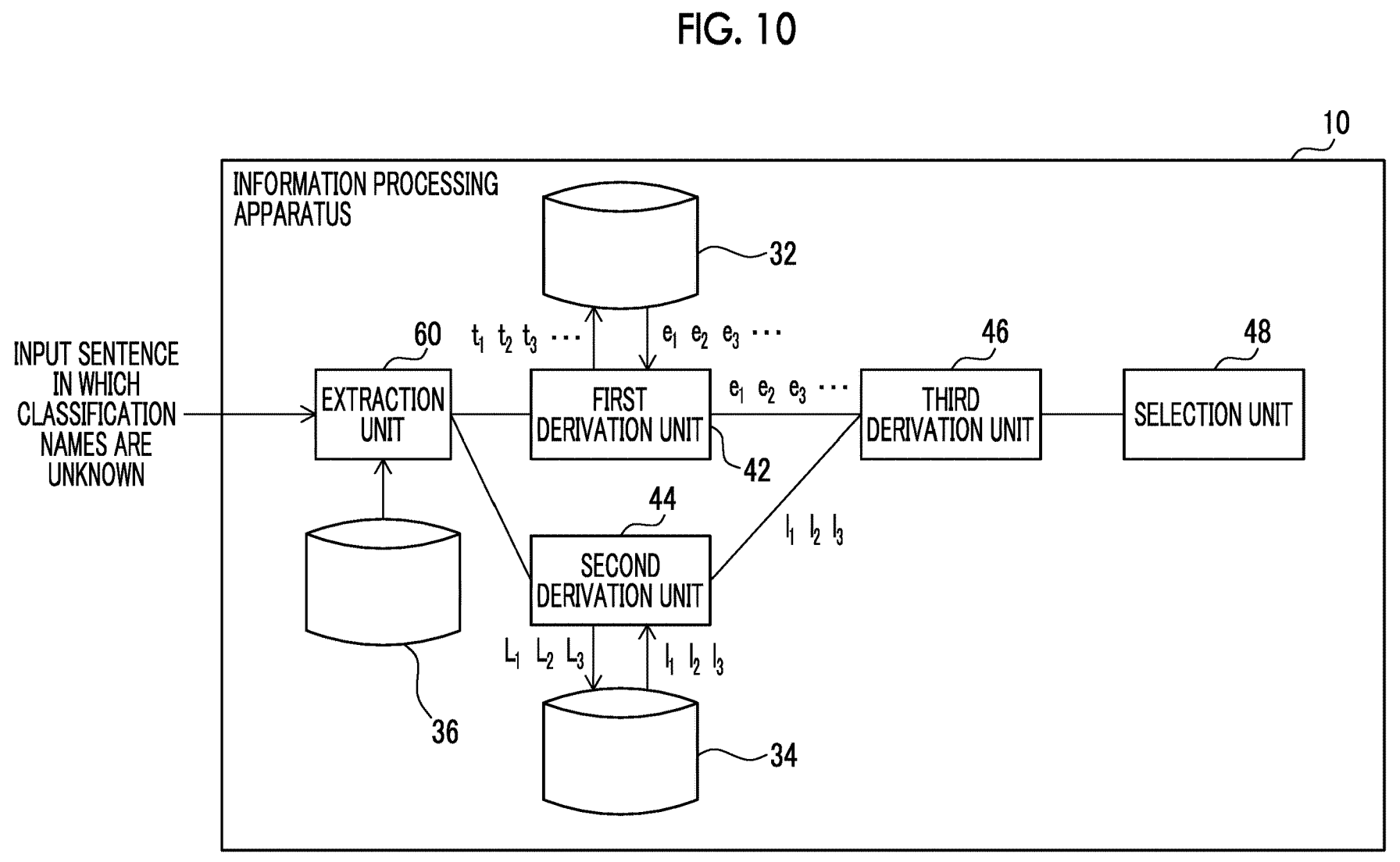

Next, a functional configuration of the information processing apparatus 10 in an operation phase will be described with reference to FIG. 10. As illustrated in FIG. 10, the information processing apparatus 10 includes an extraction unit 60, a first derivation unit 42, a second derivation unit 44, a third derivation unit 46, and a selection unit 48. By causing the CPU 20 to execute the information processing program 30, the information processing apparatus 10 functions as the extraction unit 60, the first derivation unit 42, the second derivation unit 44, the third derivation unit 46, and the selection unit 48.

The extraction unit 60 extracts a phrase corresponding to the named entity which is included in the input sentence in which the classification names are unknown from the training data 36. Specifically, the extraction unit 60 randomly extracts one phrase that is associated with the classification name associated with each word which is included in the input sentence in which the classification names are unknown from the training data 36.

The functions of the first derivation unit 42, the second derivation unit 44, the third derivation unit 46, and the selection unit 48 are the same as those in the learning phase, except that the input sentence is an input sentence in which the classification names are unknown, and thus a description thereof will be omitted. That is, the information processing apparatus 10 in an operation phase selects the classification name of each word included in the input sentence in which the classification names are unknown by using the trained model 32 and the trained model 34.

Figure 11:
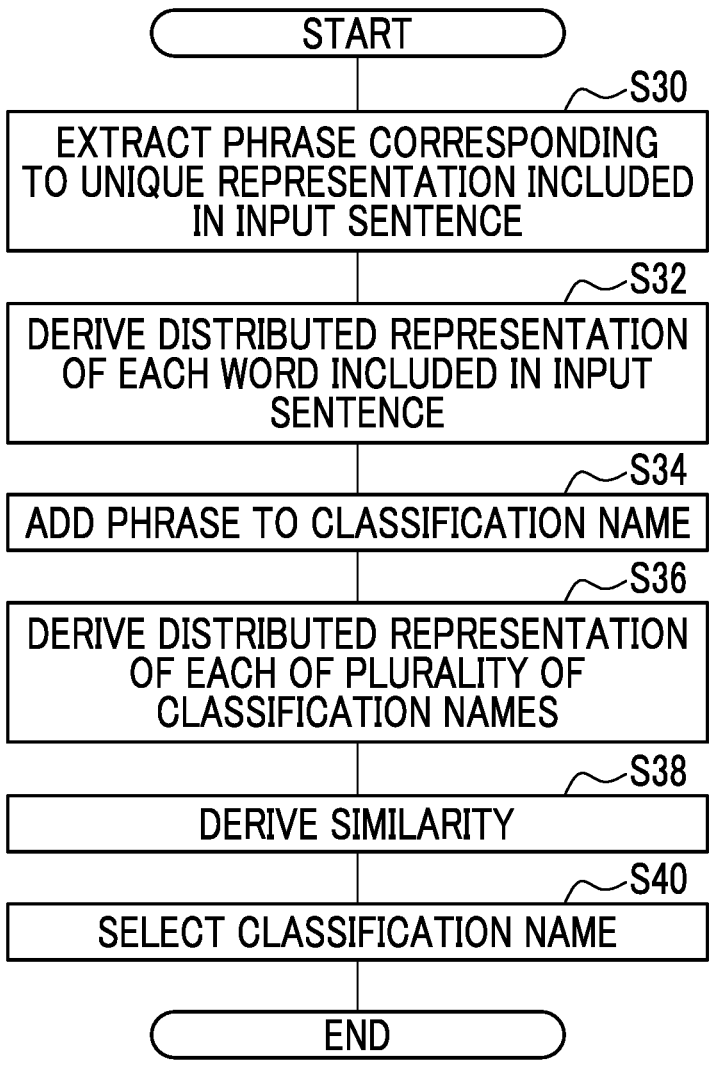
FIG. 11 is a flowchart illustrating an example of named entity recognition processing.

Next, an operation of the information processing apparatus 10 in an operation phase will be described with reference to FIG. 11. By causing the CPU 20 to execute the information processing program 30, named entity recognition processing illustrated in FIG. 11 is executed. The named entity recognition processing illustrated in FIG. 11 is executed, for example, in a case where an input sentence in which the classification names are unknown is input and an execution start instruction is input by the user.

In step S30 of FIG. 11, as described above, the extraction unit 60 extracts a phrase corresponding to the named entity which is included in the input sentence in which the classification names are unknown from the training data 36. In step S32, the first derivation unit 42 derives a distributed representation of each word included in the input sentence by inputting one input sentence in which the classification names are unknown to the trained model 32.

In step S34, the second derivation unit 44 adds the extracted phrase to the classification name corresponding to the phrase extracted in step S30 among the plurality of different classification names that are set in advance. In step S36, the second derivation unit 44 derives a distributed representation of each of the plurality of classification names to which the phrase is added by inputting the plurality of classification names to which the phrase is added in step S34 to the trained model 34.

In step S38, the third derivation unit 46 derives a similarity between the distributed representation of each word that is derived in step S32 and the distributed representation of each of the plurality of classification names to which the phrase is added that is derived in step S36. In step S40, the selection unit 48 selects the classification name of each word included in the input sentence from the plurality of classification names based on the similarity derived in step S38. In a case where processing of step S40 is ended, the named entity recognition processing is ended.

As described above, according to the present embodiment, the accuracy of the named entity recognition can be efficiently improved.

In the embodiment, a case where the extraction unit 40 extracts the phrase corresponding to the named entity included in the input sentence from the training data 36 has been described. On the other hand, the present disclosure is not limited thereto. For example, a form in which the extraction unit 40 extracts a phrase corresponding to the named entity included in the input sentence from named entity dictionary data in which a phrase and a classification name of a named entity are associated with each other may be adopted.

Further, in the embodiment, for example, as a hardware structure of a processing unit that executes various processing, such as each functional unit of the information processing apparatus 10, the following various processors may be used. As described above, the various processors include, in addition to the CPU that is a general-purpose processor that executes software (program) to function as various processing units, a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute a specific process, such as an application specific integrated circuit (ASIC).

One processing unit may be configured by one of these various processors, or may be configured by a combination of two or more processors of the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

Further, in the above-described embodiment, an aspect in which the information processing program 30 is stored (installed) in the storage unit 22 in advance has been described. On the other hand, the present disclosure is not limited thereto. The information processing program 30 may be provided by being recorded in a recording medium such as a compact disc read only memory (CD-ROM), a digital versatile disc read only memory (DVD-ROM), or a Universal Serial Bus (USB) memory. Further, the information processing program 30 may be downloaded from an external apparatus via a network.

What is claimed is:

1. An information processing apparatus comprising:
at least one processor,
wherein the processor is configured to:
extract a phrase corresponding to a named entity included in an input sentence used for training a machine-learning-type natural language processing model from data in which a phrase and a classification name of a named entity are associated with each other, wherein the machine-learning-type natural language processing model is pre-trained using bidirectional encoder representations from transformers (BERT) or a robustly optimized BERT approach (RoBERTa) technology;
add the extracted phrase to the classification name corresponding to the extracted phrase among a plurality of different classification names which are set in advance;
derive a similarity between a distributed representation of each word included in the input sentence and a distributed representation of each of the plurality of classification names to which the phrase is added; and
select a classification name of each word included in the input sentence from among the plurality of classification names based on the derived similarity.

2. The information processing apparatus according to claim 1,
wherein the data is training data used for training the natural language processing model.

3. The information processing apparatus according to claim 1,
wherein the data is named entity dictionary data.

4. The information processing apparatus according to claim 2,
wherein the processor is configured to:
randomly extract the phrase from the data.

5. The information processing apparatus according to claim 2,
wherein the processor is configured to:
extract the phrase from the data in a preset order.

6. The information processing apparatus according to claim 1,
wherein the processor is configured to:
connect text data representing the extracted phrase with text data representing a classification name corresponding to the extracted phrase.

7. The information processing apparatus according to claim 1,
wherein the processor is configured to:
add a fixed phrase to the classification name corresponding to the extracted phrase in a case where the classification name of the named entity included in the input sentence represents a classification name other than the classification name of the named entity that is designated in advance.

8. The information processing apparatus according to claim 1,
wherein the processor is configured to:
derive, as the similarity, a vector similarity between the distributed representation of each word included in the input sentence and the distributed representation of each of the plurality of classification names.

9. The information processing apparatus according to claim 1, wherein the processor is configured to:

select a classification name having a highest similarity that is derived from among the plurality of classification names.

10. The information processing apparatus according to claim 1, wherein the processor is configured to:

derive a similarity distribution between each word included in the input sentence and the distributed representation of each of the plurality of classification names to which the phrase is added, and derive a loss between the derived similarity distribution and a correct classification name corresponding to the word, and train a first trained model that outputs the distributed representation of each word included in the input sentence and a second trained model that outputs the distributed representation of each of the plurality of classification names to which the phrase is added based on the derived loss.

11. The information processing apparatus according to claim 10, wherein the processor is configured to:

select a classification name of each word included in the input sentence in which classification names are unknown by using the first trained model and the second trained model.

12. An information processing method executed by a processor of an information processing apparatus, the method comprising:

extracting a phrase corresponding to a named entity included in an input sentence used for training a machine-learning-type natural language processing model from data in which a phrase and a classification name of a named entity are associated with each other, wherein the machine-learning-type natural language processing model is pre-trained using bidirectional encoder representations from transformers (BERT) or a robustly optimized BERT approach (RoBERTa) technology;

adding the extracted phrase to the classification name corresponding to the extracted phrase among a plurality of different classification names which are set in advance;

deriving a similarity between a distributed representation of each word included in the input sentence and a distributed representation of each of the plurality of classification names to which the phrase is added; and selecting a classification name of each word included in the input sentence from among the plurality of classification names based on the derived similarity.

13. A non-transitory computer-readable storage medium storing an information processing program causing a processor of an information processing apparatus to execute a process comprising:

extracting a phrase corresponding to a named entity included in an input sentence used for training a machine-learning-type natural language processing model from data in which a phrase and a classification name of a named entity are associated with each other, wherein the machine-learning-type natural language processing model is pre-trained using bidirectional encoder representations from transformers (BERT) or a robustly optimized BERT approach (RoBERTa) technology;

adding the extracted phrase to the classification name corresponding to the extracted phrase among a plurality of different classification names which are set in advance;

deriving a similarity between a distributed representation of each word included in the input sentence and a distributed representation of each of the plurality of classification names to which the phrase is added; and selecting a classification name of each word included in the input sentence from among the plurality of classification names based on the derived similarity.

* * * * *